United States Patent [19]

Watanabe et al.

[11] Patent Number: 5,528,441
[45] Date of Patent: Jun. 18, 1996

[54] MAGNETIC HEAD INCLUDING TRACK EDGES HAVING A CUT-END FACE

[75] Inventors: Junichi Watanabe; Morio Kondo; Kazuo Ike, all of Kanagawa, Japan

[73] Assignee: Mitsumi Electric Co., Ltd., Tokyo, Japan

[21] Appl. No.: 363,870

[22] Filed: Dec. 27, 1994

[30] Foreign Application Priority Data

Dec. 29, 1993 [JP] Japan ................. 5-076023 U

[51] Int. Cl.$^6$ ................................................. G11B 5/23
[52] U.S. Cl. ................................. 360/119; 360/120
[58] Field of Search ........................... 360/120, 119, 360/126

[56] References Cited

U.S. PATENT DOCUMENTS 4,821,406  4/1989  Ota ........................... 360/120 X
5,164,870  11/1992  Kato et al. ..................... 360/119
5,212,612  5/1993  Kobayashi et al. ............... 360/120 X
5,270,894  12/1993  Okuda et al. ..................... 360/126

*Primary Examiner*—John H. Wolff
*Attorney, Agent, or Firm*—Whitham, Curtis, Whitham & McGinn

[57] ABSTRACT

In a magnetic head including metal magnetic films in a gap forming part thereof, among track edges included in the gap part of the magnetic head, track edges located on the side where record patterns are overwritten into a recording medium are so formed as to have a cut end face, and a reinforcing glass filled part is provided on the recording medium contact surface of the cut end face.

18 Claims, 1 Drawing Sheet

MAGNETIC HEAD INCLUDING TRACK EDGES HAVING A CUT-END FACE

BACKGROUND OF THE INVENTION

1. Field of the Invention

The present invention relates to magnetic recording and reproducing equipment such as VTR equipment, digital audio tape recorder equipment or the like which uses a rotary magnetic head to record and reproduce information at a high density according to a helical scan system and, in particular, to a magnetic head which uses a magnetic thin film part in a magnetic path in the magnetic recording and reproducing equipment.

2. Related Art

Conventionally, as a magnetic head using a magnetic thin film part in a magnetic path serving as a recording and reproducing gap part, there is generally known a magnetic head having a structure shown in FIG. 2 which is a plan view of the magnetic head. Description will be given below of this conventional magnetic head.

For example, to produce the conventional magnetic head 1 the plan view of which is shown in FIG. 2, at first, there are prepared a pair of core halves 2 and 3 respectively having substrate parts which are formed of Mn—Zn ferrite or the like; track grooves 2a and 3a are machined and, after then, metal magnetic thin films 5 and 6 respectively formed of ferromagnetic material, namely, Fe—Si—Al alloy or the like are disposed on mutually facing surfaces which cooperate in defining a gap part 4, thereby joining the core halves 2 and 3 with each other.

And, the gap part 4 of the magnetic head 1 has a track width T which is regulated by the track grooves 2a and 3a, while the track grooves 2a and 3a are filled with joining glass 7, which not only joins together the core halves 2 and 3 but also reinforces the gap part 4.

In the above structured conventional magnetic head 1, track edges 5a, 5b, 6a, and 6b, which are respectively used to regulate the track width T of the metal magnetic thin films 5 and 6 forming the gap part 4, are respectively formed in a round track edge shape.

However, when magnetic recording and reproduction is carried out according to a helical scan system by use of the magnetic head 1, the round shape of the track edges gives rise to occurrence of a side erase phenomenon in which, when record patterns are overwritten, an old record pattern just before a new record pattern is partly erased.

SUMMARY OF THE INVENTION

The present invention aims at eliminating the above drawback found in the conventional magnetic head. Accordingly, it is an object of the invention to provide a magnetic head which prevents occurrence of the side erase phenomenon to be able to deal with high density magnetic recording and reproduction.

In solving the above-mentioned problem, according to the invention, there is provided a magnetic head using a metal magnetic film in a gap forming part, in which, among track edges included in the gap part of the present magnetic head, track edges, which are located on the side where record patterns are overwritten into a recording medium, are so formed as to have a cut end face and a reinforcing glass filled part is formed in the recording medium contact surface of the cut end face.

According to the above structured magnetic head of the invention, since the track edges included in the gap part forming the magnetic path of the magnetic head are so formed as to have a cut end face, occurrence of the side erase phenomenon can be prevented in an area where record patterns are overwritten.

DETAILED DESCRIPTION OF PREFERRED EMBODIMENTS

Figure 1:
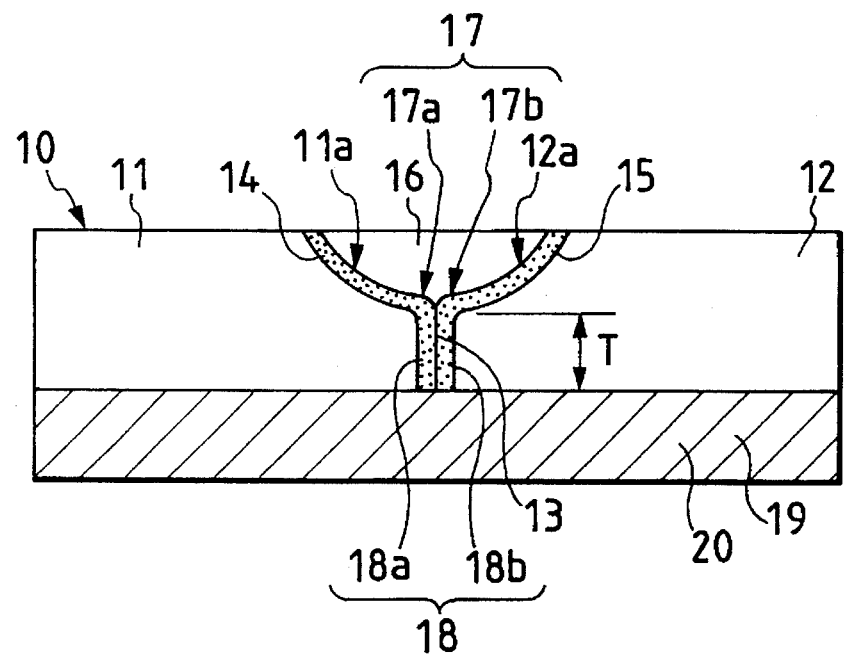
FIG. 1 is a plan view of an embodiment of a magnetic head according to the invention.
Figure 2:
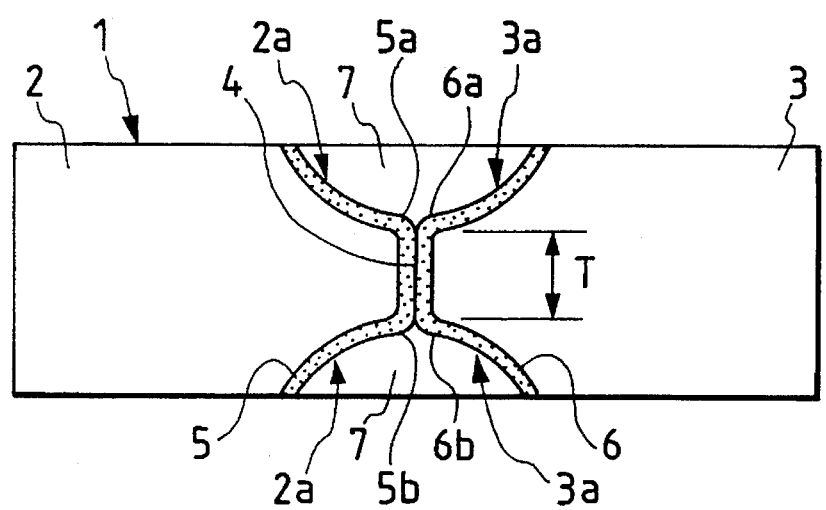
FIG. 2 is a plan view of a conventional magnetic head.

Now, description will be given below of an embodiment of a magnetic head according to the invention with reference to the accompanying drawing. FIG. 1 is a plan view of an embodiment of a magnetic head according to the invention.

As shown in FIG. 1, a magnetic head 10 according to the invention is structured in such a manner that a pair of core halves 11 and 12 are joined together and a gap part 13 is formed.

Also, the produce the magnetic head 10, there are prepared a pair of core halves 11 and 12 respectively including substrate parts which are formed of Mn—Zn ferrite or the like; track grooves 11a and 12a are machined; after then and thereafter, metal magnetic thin films 14 and 15 respectively formed of ferromagnetic material such as Fe—Si—Al alloy or the like are disposed on the mutually facing surfaces that form the gap part 13, thereby joining the core halves 11 and 12 with each other to provide a magnetic head structure.

And, while the gap part 13 of the magnetic head 10 has a track width T which is regulated by the track grooves 11a and 12a, the track grooves 11a and 12a are respectively filled with joining glass 16 to thereby be able not only to join the two core halves 11 and 12 with each other but also to reinforce the gap part 13.

Here, referring to the shapes of the track edges of the metal magnetic thin films 14 and 15 in the gap part 13 of the magnetic head 10, one-side track edges are so formed as to have a round track edge shape 17 (17a, 17b), while the track edges located on the other side, where the record patterns are overwritten, are so formed as not to have a round shape by forming a groove part 19 but to have a cut end face 18 (18a, 18b). The groove part 19, in which the cut end face 18 is formed, is filled with glass 20 having a low melting point for protection of the cut end face 18 to thereby form the recording medium contact surface of the magnetic head 10.

As has been described heretofore, according to the invention, there is provided a magnetic head using the metal magnetic thin films in the gap forming part, in which, among the track edges included in the gap part of the magnetic head, the track edges located on the side where the record patterns are overwritten are so formed as to have a cut end face and the reinforcing glass filled part is provided on the recording medium contact surface of the cut end face, whereby there can be prevented occurrence of the side erase phenomenon that an old record pattern just before a new record pattern is partly erased when the new record pattern is overwritten on the old record pattern in a recording operation according to a helical scan system, thereby being able to carry out good magnetic recording and reproduction.

What is claimed is:

1. A magnetic head having a first side comprising:

metal magnetic films in a gap forming part thereof;

a plurality of track edges included in said gap forming part of said magnetic head, wherein track edges located on said first side being formed to have a cut end face; and a reinforcing glass filled part provided on said first side, wherein said metal magnetic films on said first side have track edges each having a straight shape.

2. A magnetic head according to claim 1, further comprising a pair of core halves joined together, said gap portion being formed therebetween, wherein said pair of core halves are formed of Mn—Zn ferrite.

3. A magnetic head according to claim 1, wherein said metal magnetic films are formed of ferromagnetic material.

4. A magnetic head according to claim 3, wherein said ferromagnetic material includes Fe—Si—Al alloy.

5. A magnetic head according to claim 1, wherein said metal magnetic films on a first side have track edges having a rounded track edge shape and on a second side have said track edges having a shape other than said rounded track edge shape, wherein said track edges having a shape other than a rounded track edge shape, have a straight track edge.

6. A magnetic head according to claim 5, wherein said track edges on said second side of said metal magnetic films are formed at a position at which record patterns are for being overwritten.

7. A magnetic head according to claim 1, further comprising a pair of core halves joined together, said gap portion being formed therebetween, wherein said pair of core halves are formed of Mn—Zn ferrite and wherein said metal magnetic films are formed of ferromagnetic material.

8. A magnetic head according to claim 7, wherein said metal magnetic films on a first side have track edges having a rounded track edge shape and on a second side have said track edges having a shape other than said rounded track edge shape, wherein said track edges on said second side of said metal magnetic films are formed at a position at which record patterns are for being overwritten, wherein said track edges having a shape other than a rounded track edge shape, have a straight track edge.

9. A magnetic head according to claim 1, wherein said reinforcing glass filled part extends substantially along an entire length of said magnetic head.

10. A magnetic head comprising:

a pair of core halves joined together, a gap portion being formed therebetween;

metal magnetic thin films disposed on mutually facing surfaces of said pair of core halves forming the gap portion;

track grooves formed on the core halves to reinforce the gap portion;

a cut end face formed on one of a plurality of end portions of the track grooves; and a reinforcing glass filled part provided on the cut end face, wherein said metal magnetic thin films on said one end each have track edges having a straight shape.

11. A magnetic head according to claim 10, wherein said metal magnetic thin films are formed of ferromagnetic material and wherein said pair of core halves are formed of Mn—Zn ferrite.

12. A magnetic head according to claim 11, wherein said ferromagnetic material includes Fe—Si—Al alloy.

13. A magnetic head according to claim 10, wherein said metal magnetic thin films on a first side have track edges having a rounded track edge shape and on a second side have said track edges having a shape other than said rounded track edge shape.

14. A magnetic head according to claim 13, wherein said track edges on said second side of said metal magnetic films are formed at a position at which record patterns are for being overwritten, and wherein said track edges having a shape other than a rounded track edge shape, have a straight track edge.

15. A magnetic head according to claim 10, wherein said reinforcing glass filled part extends substantially along an entire length of said first and second core halves joined together.

16. A magnetic head comprising:

a pair of core halves joined together, a gap portion being formed therebetween;

magnetic films disposed on mutually facing surfaces forming the gap portion;

track grooves formed on the core halves to reinforce the gap portion, wherein said track grooves include a first end portion and a second end portion opposite said first end portion;

a cut end face formed on said first end portion of the track grooves, wherein track edges located on said second end portion of said track grooves have a shape other than said cut end face; and a reinforcing glass filled part provided on, wherein track edges located on said second end portion of said track grooves have a shape other than said cut end face; and a reinforcing glass filled part provided on the cut end face, wherein said magnetic films on said first end portion have track edges having a rounded track edge shape and on said second portion have track edges each having a straight shape.

17. A magnetic head according to claim 16, wherein said track edges having a shape other than a rounded track edge shape, have a straight track edge.

18. A magnetic head according to claim 17, wherein said reinforcing glass filled part extends substantially along an entire length of said first and second core halves joined together, wherein said track edges on said second side of said magnetic films are formed at a position at which record patterns are for being overwritten.

* * * * *